(12) United States Patent
Yang et al.

(10) Patent No.: US 7,966,627 B2
(45) Date of Patent: Jun. 21, 2011

(54) EMERGENCY EJECTING APPARATUS FOR OPTICAL DISC DRIVE

(75) Inventors: Fu-Jen Yang, Taipei (TW); Chun-Hung Chen, Taipei (TW); Ming-Chao Li, Taipei (TW); Li-Feng Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 0 days.

(21) Appl. No.: 12/907,108

(22) Filed: Oct. 19, 2010

(65) Prior Publication Data
US 2011/0035762 A1 Feb. 10, 2011

Related U.S. Application Data

(62) Division of application No. 11/943,156, filed on Nov. 20, 2007, now Pat. No. 7,908,612.

(30) Foreign Application Priority Data

Dec. 15, 2006 (TW) .............................. 95147120 A

(51) Int. Cl.
*G11B 17/04* (2006.01)
(52) U.S. Cl. .................... 720/619; 720/609; 720/636
(58) Field of Classification Search .......... 720/601–616, 720/636–638; 360/99.02, 99.03, 99.06, 99.07
See application file for complete search history.

(56) References Cited

U.S. PATENT DOCUMENTS

| | | | |
|---|---|---|---|
| 4,680,748 A | 7/1987 | Kobayashi | |
| 6,266,311 B1 | 7/2001 | Song et al. | |
| 7,111,310 B2 * | 9/2006 | Makisaka et al. | 720/619 |
| 2005/0102689 A1 | 5/2005 | Saji et al. | |
| 2008/0010650 A1 * | 1/2008 | Fujisawa | 720/623 |

FOREIGN PATENT DOCUMENTS
JP    2003109283 A    4/2003

OTHER PUBLICATIONS

Machine-Assisted translation of JP 2003109283 A, including abstract dated Apr. 11, 2003.

* cited by examiner

*Primary Examiner* — Wayne R Young
*Assistant Examiner* — Nathan A Danielsen
(74) *Attorney, Agent, or Firm* — Thomas, Kayden, Horstemeyer & Risley, LLP

(57) ABSTRACT

The present invention discloses an optical disc drive including a pickup head for reading data from a disc; a spindle motor for supporting and rotating the disc; a loading/ejecting apparatus for loading or ejecting the disc; and an emergency ejecting apparatus. The emergency ejecting apparatus includes a slider for connecting the loading/ejecting apparatus, a rack, an elastic component for connecting the slider and the rack and a rotator rotated with the movement of the slider. When a user drives the rotator and the elastic component is elastically deformed, the slider is moved in the optical disc drive to drive the loading/ejecting apparatus to eject the disc.

2 Claims, 8 Drawing Sheets

EMERGENCY EJECTING APPARATUS FOR OPTICAL DISC DRIVE

CROSS-REFERENCE TO RELATED APPLICATIONS

This application is a divisional of U.S. application Ser. No. 11/943,156, filed Nov. 20, 2007 and entitled OPTICAL DISC DRIVE, the entire contents of which are incorporated herein by reference.

FIELD OF THE INVENTION

The present invention relates to an optical disc drive, and more particularly to an optical disc drive having an emergency ejecting apparatus.

BACKGROUND OF THE INVENTION

A slot-in optical disc drive has the features of pretty appearance and easy operation. A user can easily put a disc into the optical disc drive by a loading/ejecting apparatus of the slot-in optical disc drive. If they want to eject the disc, they can push an ejecting button to drive the loading/ejecting apparatus to eject the disc. Because the loading/ejecting apparatus is driven by the motor, when the system of the optical disc drive is broken or loses power, the loading/ejecting apparatus won't eject the disc automatically. At the time, it is necessary to drive an emergency ejecting apparatus to eject the disc.

For example, the US patent publication number 2004/0223420 published to Kazuo Yokota shows a slot-in optical disc drive 1 including an emergency ejecting apparatus for ejecting the disc manually. The optical disc drive 1 has a loading motor 21 connected to the emergency ejecting apparatus, and then the emergency ejecting apparatus is connected to a loading/ejecting apparatus. The loading/ejecting apparatus includes an ejecting lever 17 and a guide lever 18. The loading motor 21 drives the emergency ejecting apparatus, and then the loading/ejecting apparatus is driven to load or eject a disc. The emergency ejecting apparatus includes a loading gear unit G1 and a rack gear unit G2 with special structure for meshing with the loading gear unit G1. Moreover, the back end of the rack gear unit G2 is connected to the loading/ejecting apparatus. The loading motor 21 drives the loading gear unit G1 so that the rack gear unit G2 moves in the optical disc drive, and then the loading/ejecting apparatus is driven to load or eject the disc by the movement of the rack gear unit G2.

When the optical disc drive 1 can't eject the disc automatically because of the system breaking down or the loss of the power, the loading motor 21 cannot drive the loading gear unit G1. Therefore, the loading gear unit G1 and the rack gear unit G2 are locked because they are meshed with the loading motor 21. A user has to put an emergency pin P into a through hole 3b formed in the bezel 3 of the optical disc drive 1. The position of the through hole 3b is set corresponding to the driving gear set G1, so a user can insert the emergency pin P to loose the connection between the loading gear unit G1 and the loading motor 21. When the loading gear unit G1 can rotate freely without being constrained by the loading motor 21, the user has to insert the emergency pin P into a through hole 3c formed in the bezel 3 again. The position of the through hole 3c is set corresponding to the rack gear unit G2 and the emergency pin P can push the rack gear unit G2 to move in the optical disc drive. Therefore, the loading/ejecting apparatus is driven by the rack gear unit G2 to eject the disc.

However, the emergency ejecting apparatus described above comprises many components. For example, the loading gear unit G1 not only has worm gear 22 and double gears 23, 24, and 25, but also has a slider member 31, two pivotal support pins 28, and 32 and a tension coil spring 33. The connections of the components are very complex, so if one of them is useless, the emergency ejecting apparatus can't eject a disc manually. Moreover, the more components of the emergency ejecting apparatus, the bigger size of the optical disc drive will be for installing the emergency ejecting apparatus.

Moreover, a user has to insert the emergency pin P into the through hole 3b and 3c to drive the emergency ejecting apparatus to eject the disc. Also, a user has to make sure the manual ejection step is correct. Therefore, it's really inconvenient for a user to manually eject the disc.

Therefore, the present invention is to find a way to decrease the components of the emergency ejecting apparatus of the optical disc drive and to decrease the size of the optical disc drive for overcoming the drawbacks of the emergency ejecting apparatus mentioned above.

SUMMARY OF THE INVENTION

Accordingly, this invention is to provide an optical disc drive. The optical disc drive has an emergency ejecting apparatus which has simple structure and easy operation. When the system of the optical disc drive is breaking down or the loss of power, a user can eject the disc by driving the emergency ejecting apparatus manually.

Therefore, the present invention provides an optical disc drive including a pickup head for reading/writing data from/onto a disc; a spindle motor for supporting and rotating the disc; a loading/ejecting apparatus for loading or ejecting the disc; and an emergency ejecting apparatus including a slider for connecting the loading/ejecting apparatus, a rack, an elastic component for connecting the slider and the rack, and a rotator rotated with the movement of the slider. When a user drives the rotator, the elastic component will have elastic deformation and then the slider is movable relative to the rack. And then the user can drive the loading/ejecting apparatus to eject the disc.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENT

Figure 1:
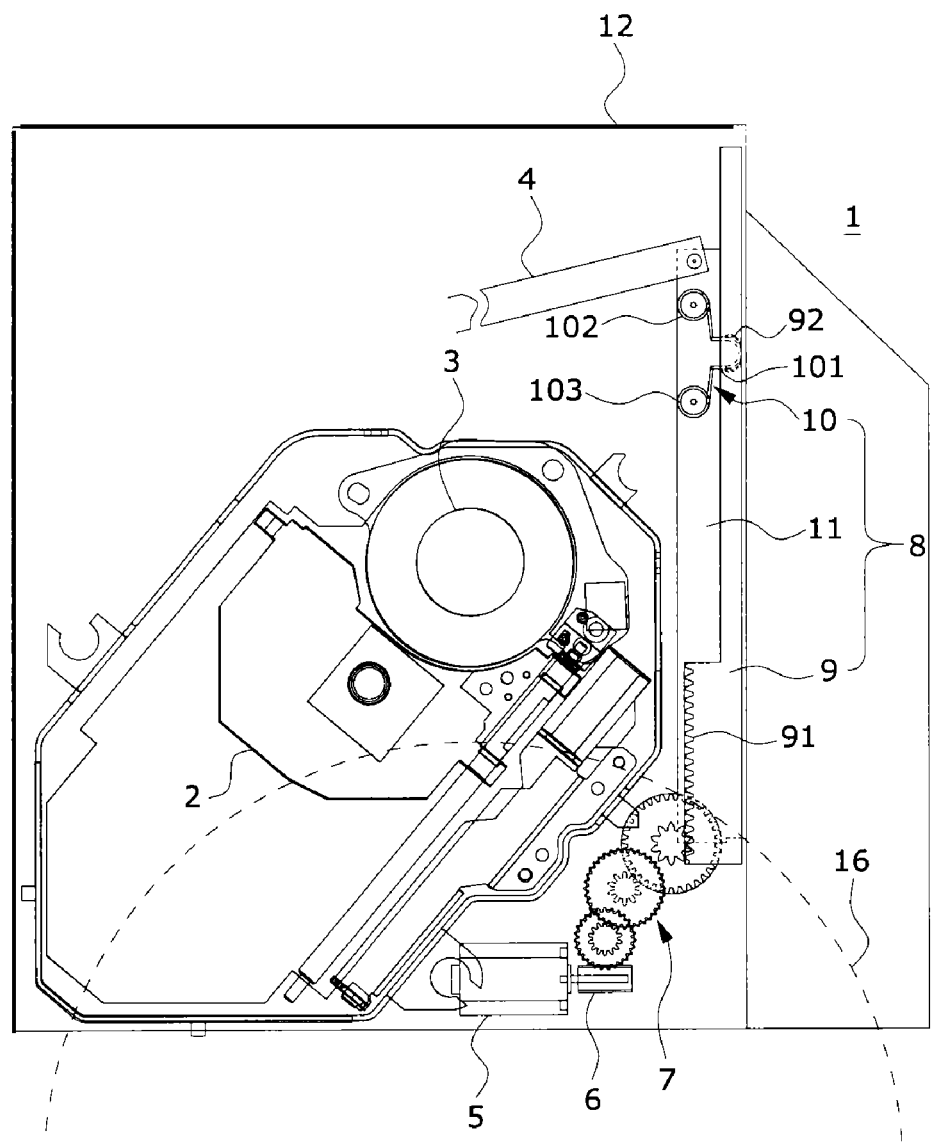
FIG. 1 shows a perspective view of a first embodiment of the optical disc drive of the present invention

Referring to FIG. 1, it's a perspective view of the first embodiment of an optical disc drive 1 of the present invention. The optical disc drive 1 has an optical pickup head 2 for reading/writing the data from/onto a disc 16, a spindle motor 3 for supporting and rotating the disc 16, and a loading/ejecting apparatus 4 for loading or ejecting the disc 16.

Besides, the optical disc drive 1 also has a transmitting motor 5, a worm gear 6, a gear set 7, and an emergency ejecting apparatus 8. The worm gear 6 is set on a rotating axle of the transmitting motor 5 and meshed with the gear set 7. The gear set 7 is connected to the emergency ejecting apparatus 8, and the emergency ejecting apparatus 8 is connected to the loading/ejecting apparatus 4. When the transmitting motor 5 drives the worm gear 6 and the gear set 7 to rotate, the emergency ejecting apparatus 8 is moved in the optical disc drive 1 because of the connections therebetween. And then the emergency ejecting apparatus 8 drives the loading/ejecting apparatus 4 to load or eject the disc 16.

In this invention, since the structure of the loading/ejecting apparatus 4 is not the relevant feature of the present invention, detailed descriptions and drawings thereof are omitted herein for the sake of brevity.

Referring to FIG. 1, it is the first embodiment of the emergency ejecting apparatus 8 of the invention. The emergency ejecting apparatus 8 includes a rack 9, an elastic component 10, and a slider 11, wherein the slider 11 is connected with the rack 9 by the elastic component 10. When the transmitting motor 5 drives the rack 9 to move in the optical disc drive 1, the slider 11 is moved with the rack 9. The rack 9 has teeth 91 and the gear set 7 is connected to the emergency ejecting apparatus 8 by meshing with the teeth 91 of the rack 9. When the optical disc drive 1 loads or ejects the disc 16, the power outputted by the transmitting motor 5 drives the gear set 7 to rotate through the worm gear 6, and then the gear set 7 drives the emergency ejecting apparatus 8 to move in the optical disc drive 1. And further, the emergency ejecting apparatus 8 drives the loading/ejecting apparatus 4 to load or eject the disc 16.

In the first embodiment, the elastic component 10 has a protrusion 101 and a first and a second ends 102, 103 which are set on the slider 11 and the rack 9, respectively as shown in FIG. 1. The protrusion 101 is semicircle and the rack has a concavity 92 corresponding to the protrusion 101 for holding the protrusion 101 of the elastic component 10. Therefore, the elastic component 10 is connected to the rack 9 by putting the protrusion 101 of the elastic component 10 into the concavity 92 of the rack 9. The elastic component 10 constraints the slider 11 to move with the rack 9 when the rack 9 is driven by the gear set 7. And then the loading/ejecting apparatus 4 connected to the terminal of the slider 11 is moved to load or eject the disc 16. However, in the present invention, the first and the second ends 102, 103 of the elastic component 10 can also be set on the rack 9, while the concavity 92 is set on the slider 11 relatively to the protrusion 101. Moreover, the shape of the protrusion 101 is not limited to be semicircle, and it also can be other shapes, for example the ellipse shape.

Figure 2:
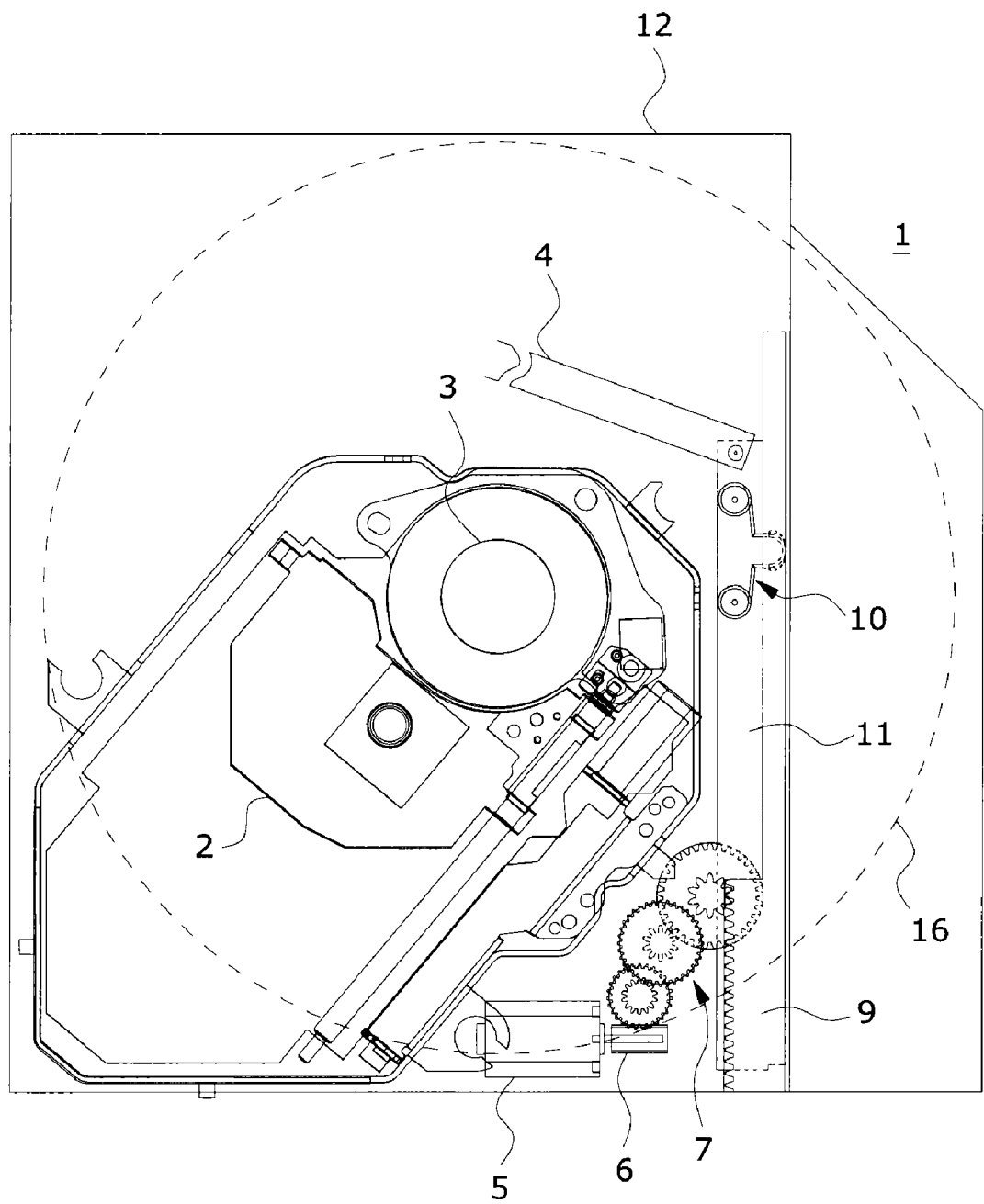
FIG. 2 shows a perspective view of the optical disc drive loading an optical disc as shown in FIG. 1

Referring to FIG. 1, it shows a perspective view of the optical disc drive 1 without loading a disc of the present invention, while FIG. 2 shows a perspective view of the optical disc drive 1 loading a disc. As described above, when the optical disc drive 1 loads the disc 16, the transmitting motor 5 drives the worm gear 6 and the gear set 7. And then the rack 9 and the slider 11 are moved in the optical disc drive 1. Furthermore, the loading/ejecting apparatus 4 is driven to load the disc 16 into the optical disc drive 1 as shown in FIG. 2. In FIG. 2, the terminal of the slider 11 is not toward the back 12 of the optical disc drive 1. On the contrary, when the optical disc drive 1 ejects the disc 16, the loading/ejecting apparatus 4 ejects the disc 16 and the terminal of the slider 11 is toward the back 12 of the optical disc drive 1 as shown in FIG. 1.

Figure 3:
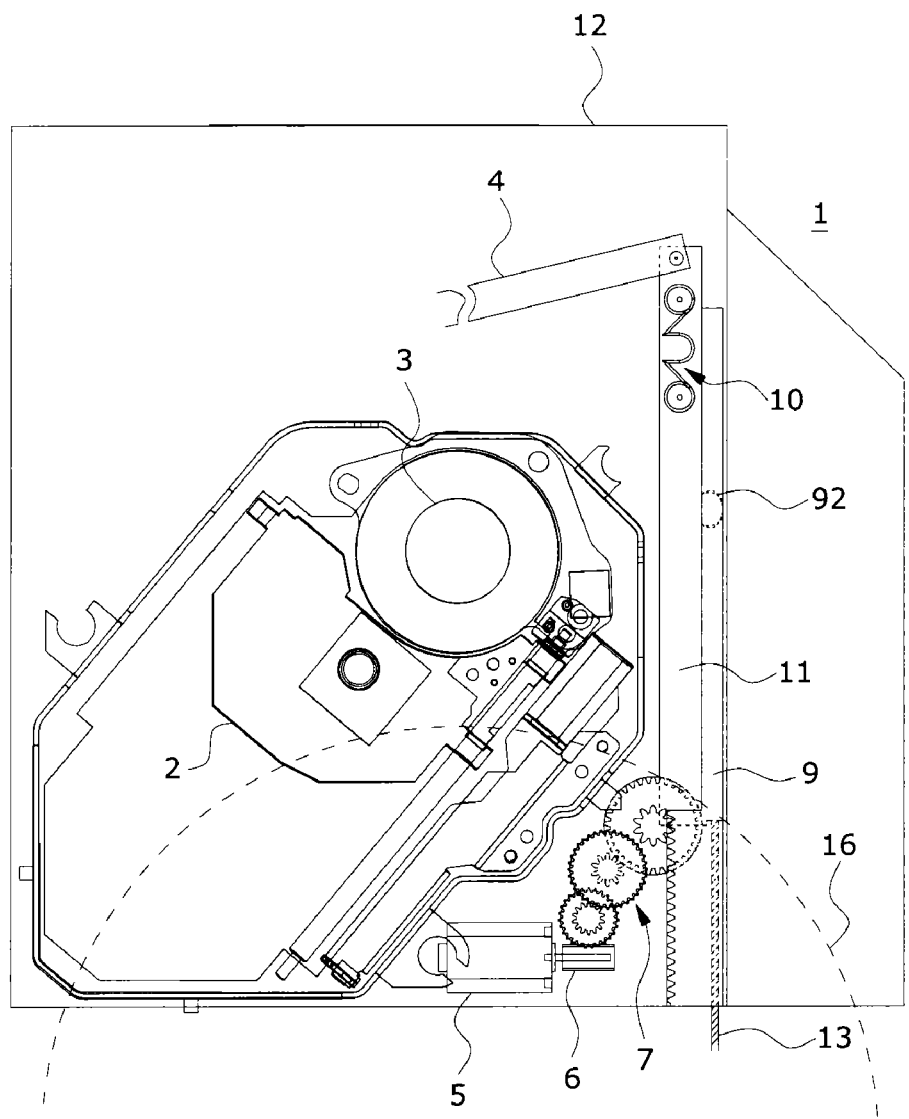
FIG. 3 shows a perspective view of the optical disc drive which is driven manually to eject the disc as shown in FIG. 1

Referring to FIG. 3, it's a perspective view of the optical disc drive 1 that ejects the disc manually of the invention. When a disc 16 is loaded into the optical disc drive 1 as shown in FIG. 2, and the optical disc drive 1 can't eject the disc 16 automatically by the transmitting motor 5 because of the loss of the power or the broken system, the transmitting motor 5, the worm gear 6, the gear set 7 and the rack 9 are in the locked state because they are meshed and connected with each other. At the time, a user can manually drive the emergency ejecting apparatus 8 to eject the disc 16.

The user puts a pin 13 into a through hole on the bezel of the optical disc drive 1, and the through hole is set relatively to the slider 11. So the pin 13 can drive the slider 11 through the through hole. When the user pushes the slider 11 by the pin 13, the protrusion 101 of the elastic component 10 is elastically deformed. And then the protrusion 101 is not connected with the concavity 92 of the rack 9. Therefore, the slider 11 is moved toward the back 12 of the optical disc drive 1. Therefore, the loading/ejecting apparatus 4 connected to the slider 11 is driven to eject the disc 16 as shown in FIG. 3.

Figure 4:
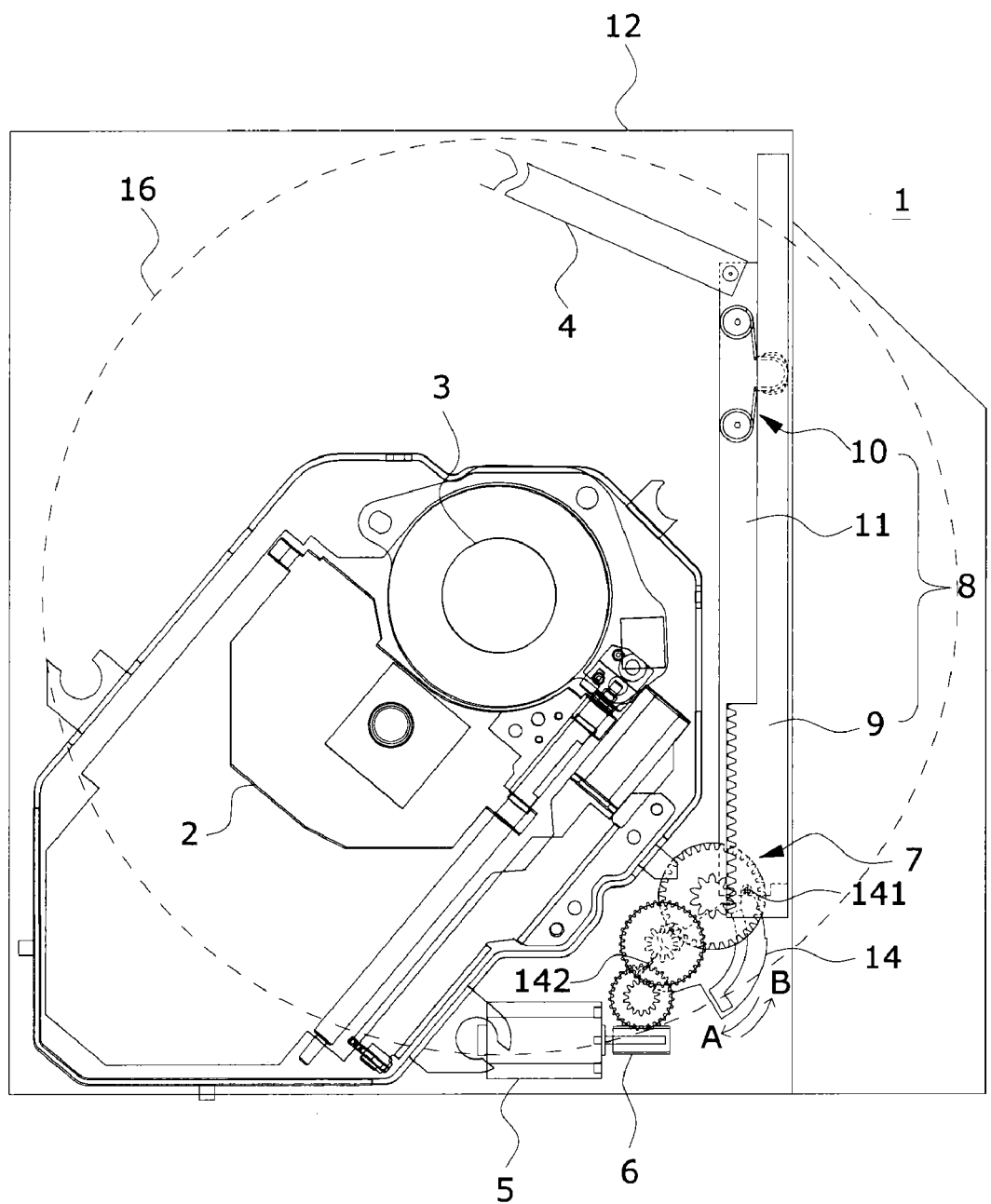
FIG. 4 shows a perspective view of a second embodiment of the optical disc drive of the present invention

Referring to FIG. 4, it's a perspective view of the second embodiment of the optical disc drive 1 of the invention. In the embodiment, the direction of the action that the emergency ejecting apparatus 8 drives the loading/ejecting apparatus 4 to load or eject a disc is contrary to the first embodiment. The other components and the numerals are the same as the first embodiment.

In the embodiment, the emergency ejecting apparatus 8 of the optical disc drive 1 has the slider 11, the elastic component 10, the rack 9 and a rotator 14. The rotator 14 has a connector 141 and a board 142, wherein the connector 141 is connected to the slider 11 so that the rotator 14 can rotate with the movement of the slider 11.

In the second embodiment, when the optical disc drive 1 loads the disc 16, the transmitting motor 5 drives the worm gear 6 and the gear set 7. And then the gear set 7 drives the emergency ejecting apparatus 8 to move toward the back 12 of the optical disc drive 1. So that the loading/ejecting apparatus 4 connected to the slider 11 is driven to load the disc 16 as shown in FIG. 4. When loading the disc 16, the rotator 14 is rotated in the direction of arrow B during the movement of the slider 11. On the contrary, when the loading/ejecting apparatus 4 ejects the disc 16, the slider 11 is moved in the direction of arrow C and the rotator 14 is rotated in the direction of arrow A.

Figure 5:
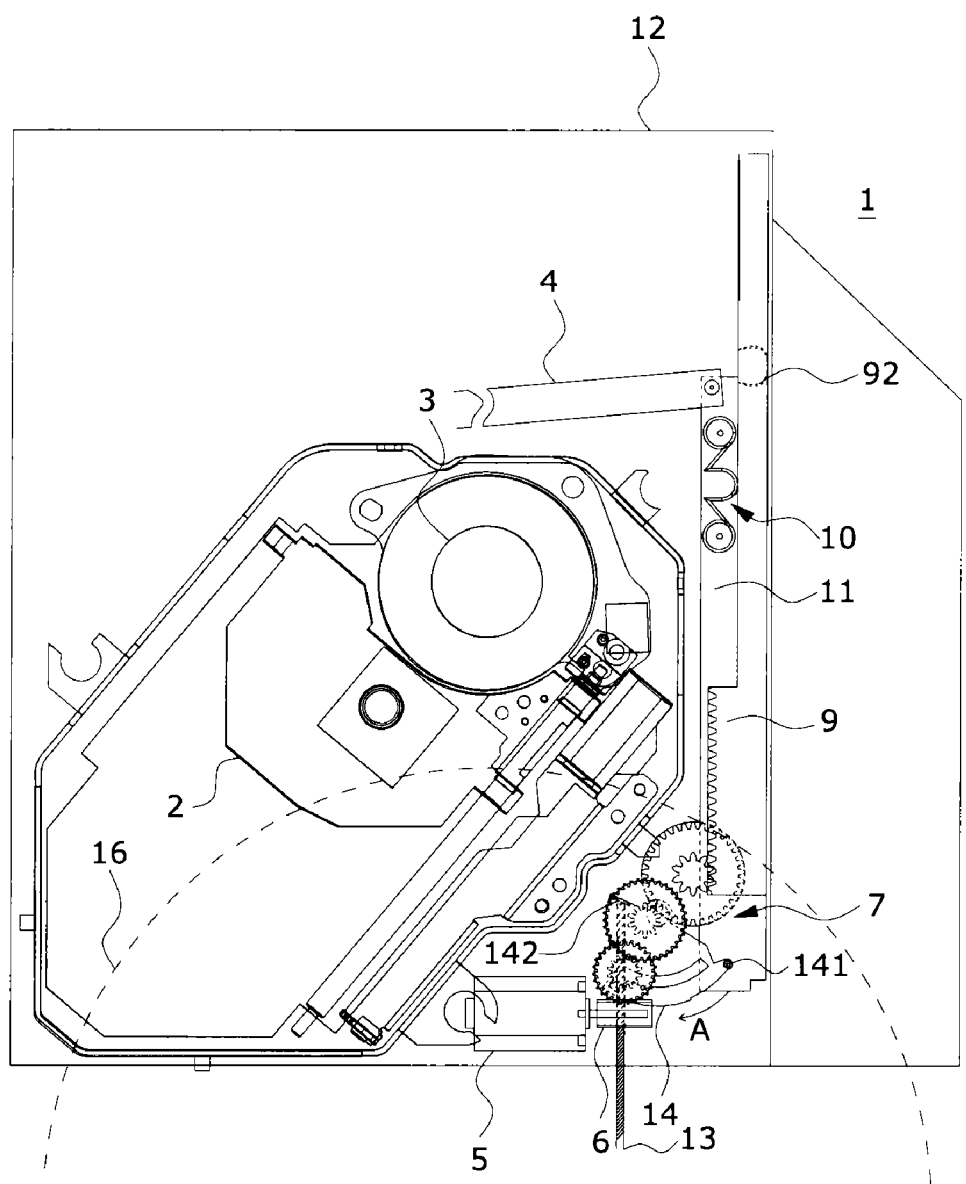
FIG. 5 shows a perspective view of the optical disc drive which is driven manually to eject the disc as shown in FIG. 4

Referring to FIG. 5, it's a perspective view of the optical disc drive 1 that ejects the disc manually of the invention. When a disc 16 is loaded into the optical disc drive 1, as shown in FIG. 4, and the optical disc drive 1 can't eject the disc 16 by the transmitting motor 5 because of the loss of the power or the broken system, the transmitting motor 5, the worm gear 6, the gear set 7 and the rack 9 are in the locked state because they are meshed and connected with each other. At the time, a user can manually drive the emergency ejecting apparatus 8 to eject the disc 16.

A user puts a pin 13 into a through hole on the bezel of the optical disc drive 1, and the through hole is set relatively to the position of the board 142 after the disc 16 is loaded. When the user forces the rotator 14 to rotate in the direction of arrow A, the protrusion 101 of the elastic component 10 is elastically deformed. Then the protrusion 101 is not connected with the concavity 92 of the rack 9. Therefore, the slider 11 is moved backward to drive the loading/ejecting apparatus 4 to eject the disc 16 as shown in FIG. 5.

Figure 6:
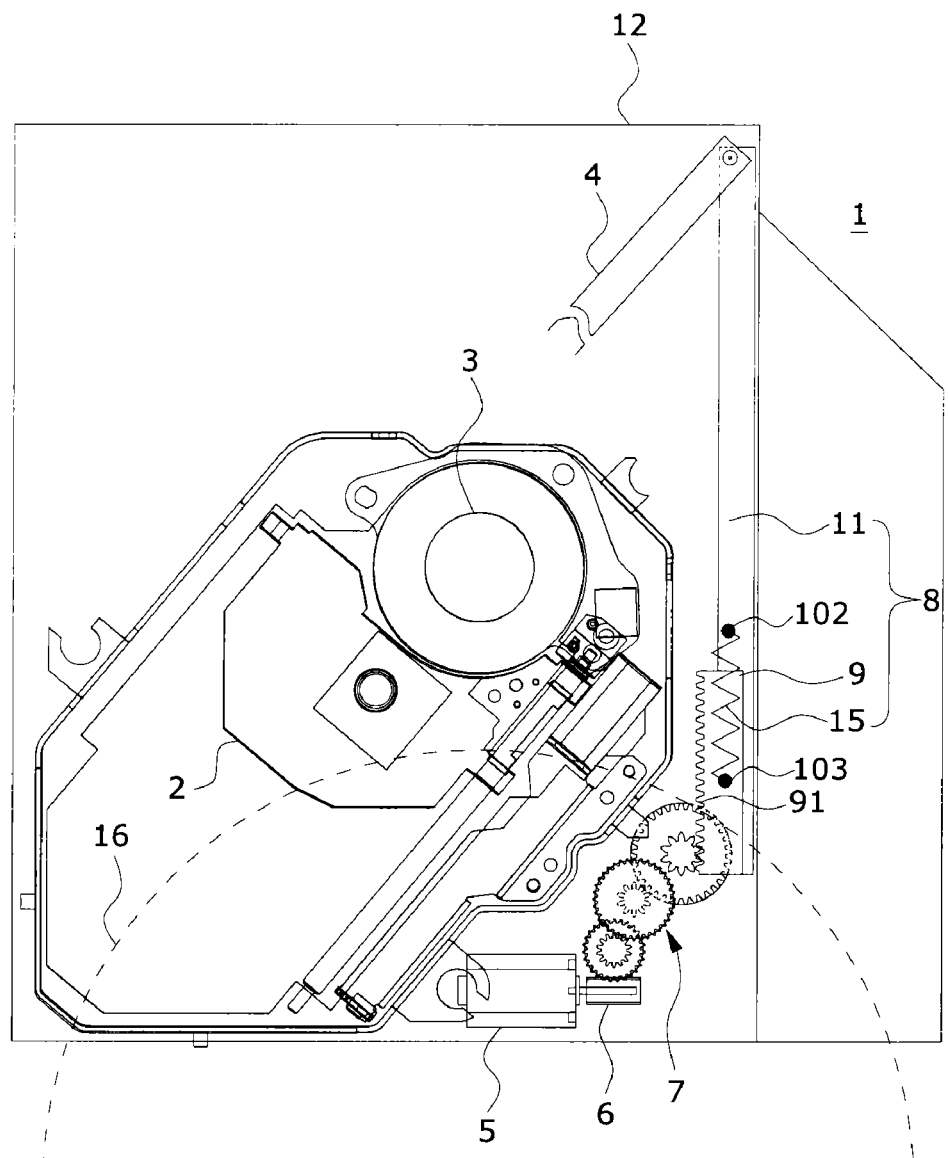
FIG. 6 shows a perspective view of a third embodiment of the optical disc drive of the present invention
Figure 7:
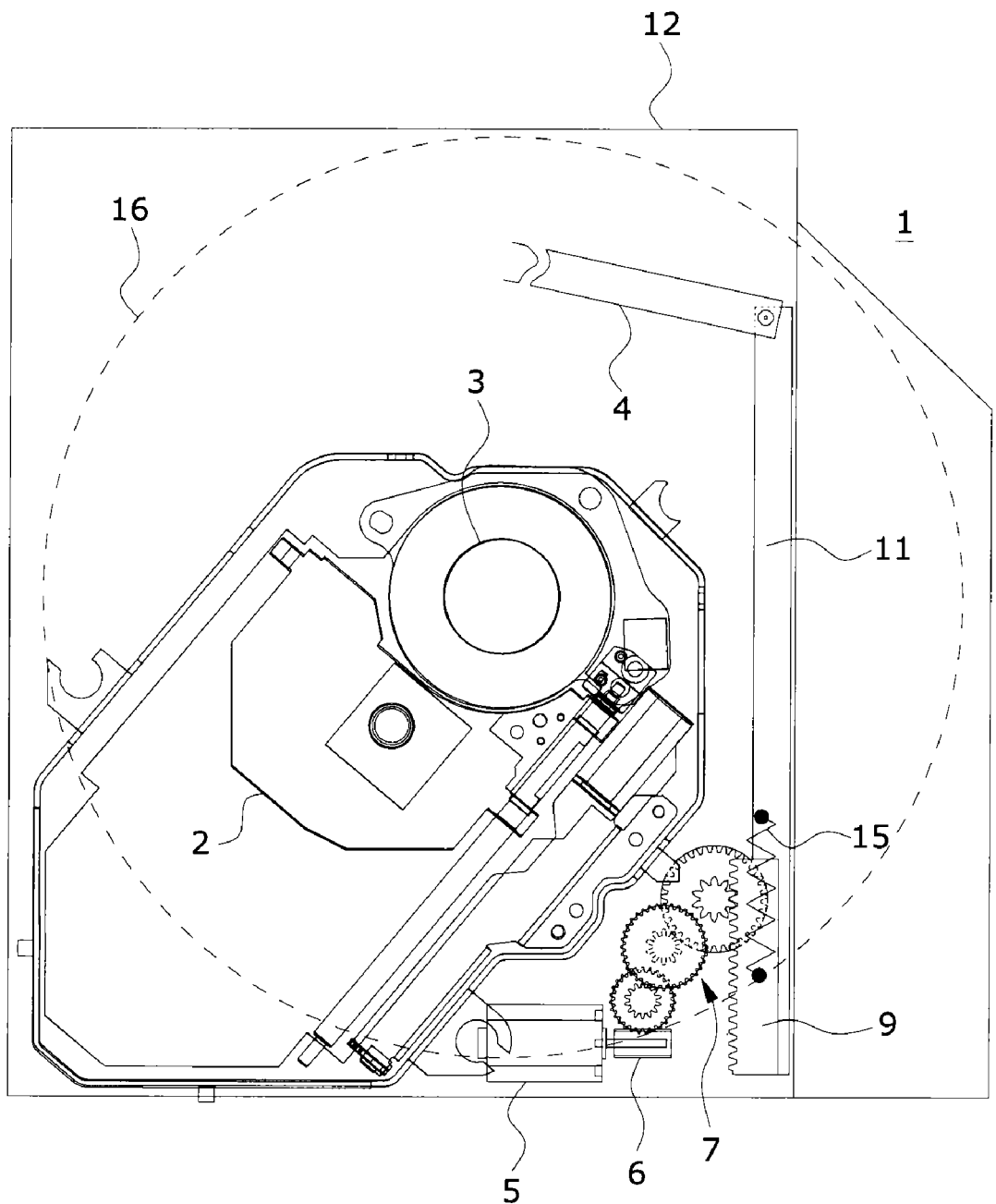
FIG. 7 shows a perspective view of the optical disc drive loading an optical disc as shown in FIG. 6

Referring FIG. 6 and FIG. 7, they are the perspective views of the optical disc drive 1 loading and ejecting the disc 16 of the third embodiment. In the embodiment, the elastic component is a spring 15. The other components and the numerals are the same as the first embodiment. Moreover, the actions of the optical disc drive 1 loading and ejecting the disc 16 are the same as that of the first embodiment. The transmitting motor 5 drives the worm gear 6, the gear set 7 and the emergency ejecting apparatus 8 to load or eject the disc 16. When the loading/ejecting apparatus 4 eject the disc 16, the end of the slider 11 is toward the back 12 of the optical disc drive 1 as shown in FIG. 6. On the contrary, when the loading/ejecting apparatus 4 loads the disc 16, the end of the slider 11 is not toward the back 12 of the optical disc drive 1 as shown in FIG. 7.

Figure 8:
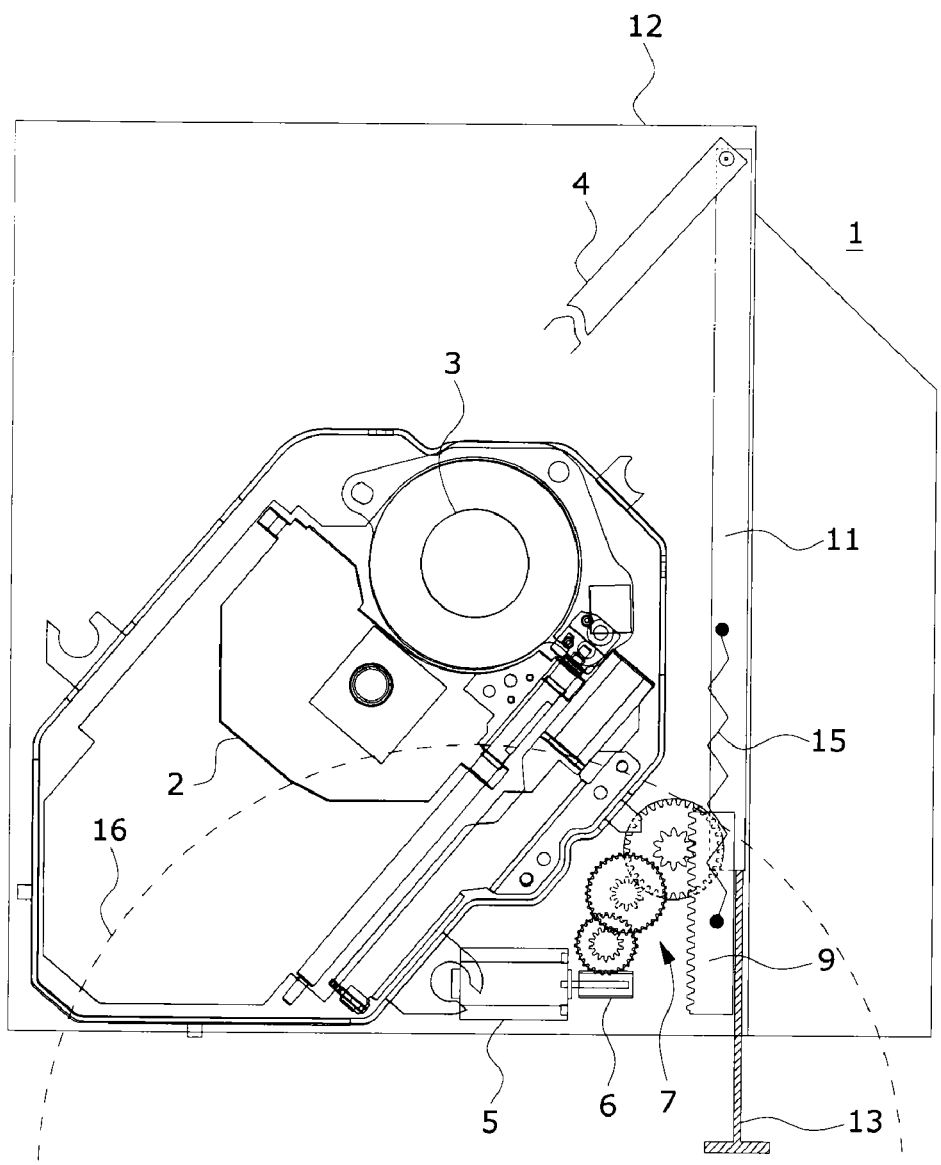
FIG. 8 shows a perspective view of the optical disc drive which is driven manually to eject the disc as shown in FIG. 6

Referring to FIG. 8, it's a perspective view of the optical disc drive 1 ejecting the disc manually of the embodiment. When the disc 16 is loaded into the optical disc drive 1, as shown in FIG. 7, and the optical disc drive 1 can't eject the disc 16 by the transmitting motor 5 because of the loss of the power or the broken system, the transmitting motor 5, the worm gear 6, the gear set 7, and the rack 9 are in the locked state because they are meshed and connected with each other.

At the time, the user can put the pin 13 into the through hole on the bezel of the optical disc drive 1, and the through hole is set relatively to the slider 11. Therefore, the user can push the slider 11 by the pin 13. When the user forces the spring 15 to be elastically deformed, the slider 11 is pushed toward the back 12 of the optical disc drive 1. And then the loading/ejecting apparatus 4 is driven to eject the disc 16.

As described above, the optical disc drive of the invention has an emergency ejecting apparatus which is connected to a loading/ejecting apparatus to drive the loading/ejecting apparatus to load or eject the disc. The emergency ejecting apparatus further includes a rack, a slider, and an elastic component. The slider is connected to the rack by the elastic component and the slider is connected to the loading/ejecting apparatus. When the optical disc drive can't eject the disc automatically, the user drives the slider to make the elastic deformation of the elastic component. So that the slider is moved in the optical disc drive to drive the loading/ejecting apparatus to eject the disc. So the optical disc drive of the invention still can eject the disc under the loss of the power or the broken system, and it also has the features of simple structures and easy operation.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An optical disc drive comprising:
    an optical pickup head for reading/writing the data from/onto a disc;
    a spindle motor for supporting and rotating the disc;
    a loading/ejecting apparatus for loading or ejecting the disc; and
    an emergency ejecting apparatus comprising:
        a rack having a concavity;
        a slider connected to the loading/ejecting apparatus;
        an elastic component having a protrusion corresponding to the concavity for connecting the slider and the rack, wherein the elastic component has two ends set on the slider; and
        a rotator which has a board and a connector, wherein the connector is connected to the slider and the rotator is rotated with the movement of the slider;
    wherein when a user rotates the rotator through the board, the elastic component is elastically deformed so that the protrusion is not connected to the concavity and the slider is moved in the optical disc drive to drive the loading/ejecting apparatus to eject the disc.

2. An optical disc drive comprising:
    an optical pickup head for reading/writing the data from/onto a disc;
    a spindle motor for supporting and rotating the disc;
    a loading/ejecting apparatus for loading or ejecting the disc; and
    an emergency ejecting apparatus comprising:
        a rack;
        a slider connected to the loading/ejecting apparatus and having a concavity;
        an elastic component having a protrusion corresponding to the concavity for connecting the slider and the rack, wherein the elastic component has two ends set on the rack; and
        a rotator which has a board and a connector, wherein the connector is connected to the slider and the rotator is rotated with the movement of the slider;
    wherein when a user rotates the rotator through the board, the elastic component is elastically deformed so that the protrusion is not connected to the concavity and the slider is moved in the optical disc drive to drive the loading/ejecting apparatus to eject the disc.

\* \* \* \* \*